United States Patent [19]
Tomita et al.

[11] 3,892,745
[45] July 1, 1975

[54] ISOXAZOLONE DERIVATIVES AND PROCESS FOR PREPARING THE SAME

[75] Inventors: Kazuo Tomita, Yokosuka; Tadashi Murakami, Tokyo; Hiromu Takagi, Tokyo; Yasuhiro Morisawa, Tokyo, all of Japan

[73] Assignee: Sankyo Company Limited, Tokyo, Japan

[22] Filed: Nov. 20, 1972

[21] Appl. No.: 307,864

[52] U.S. Cl....260/247.2 A; 260/247.2 B; 260/268 C; 260/268 BC; 260/268 PH; 260/293.58; 260/293.67; 260/307 A; 424/246; 424/248; 424/267; 424/272
[51] Int. Cl.[2]....................................... C07D 295/04
[58] Field of Search.... 260/307 A, 247.2 A, 293.67, 260/268 PH

[56] References Cited
FOREIGN PATENTS OR APPLICATIONS
1,057,995  2/1967  United Kingdom............. 260/307 A OTHER PUBLICATIONS
Noller, Chem. of Organic Cmpds., Saunders, 1960, p. 257.

*Primary Examiner*—Anton H. Sutto
*Assistant Examiner*—Paul J. Killos
*Attorney, Agent, or Firm*—Flynn & Frishauf

[57] ABSTRACT

New isoxazolone derivatives having the formula

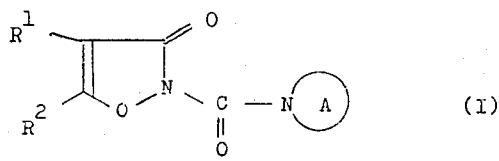

wherein $R^1$ represents hydrogen atom, a lower alkyl group or a halogen atom; $R^2$ represents hydrogen atom, a lower alkyl group, an alkoxycarbonyl group or an aryl group; $R^1$ and $R^2$ may form, together with the carbon atoms to which they are attached, a benzene ring fused with isoxazolone ring; and a group of the formula

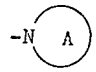

represents a saturated cyclic amino group which may have a substituent and an additional hetero-atom. They have analgesic, anti-inflammatory, antitussive and antihypertensive activities and thus they are useful as drugs and prepared by reacting the corresponding N-halogenocarbonylisoxazolone with a cyclic amine or, alternatively, by reacting the corresponding 3-hydroxyxisoxazole with a carbamoyl halide.

15 Claims, No Drawings

ISOXAZOLONE DERIVATIVES AND PROCESS FOR PREPARING THE SAME

This invention relates to a new group of isoxazolone derivatives and a process for preparing the same.

More particularly, this invention is concerned with an isoxazolone derivative having a cyclic aminocarbonyl substituent at the 2-position thereof, which is represented by the formula

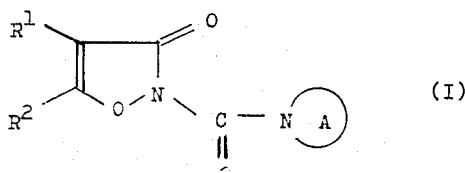

wherein $R^1$ represents hydrogen atom, a lower alkyl group or a halogen atom; $R^2$ represents hydrogen atom, a lower alkyl group, an alkoxycarbonyl group or an aryl group; $R^1$ and $R^2$ may form, together with the carbon atoms to which they are attached, a benzene ring fused with isoxazolone ring; and a group of the formula

represents a saturated cyclic amino group which may have a substituent and an additional hetero-atom.

This invention is also concerned with a process for the preparation of the isoxazolone derivative (I).

In the above formula (I), the lower alkyl group is preferably of 1 to 4 carbon atoms and may be exemplified by methyl, ethyl, propyl, isopropyl, butyl, isobutyl, sec.-butyl and tert.-butyl. The halogen atom may be chlorine, bromine, fluorine and iodine. The alkoxycarbonyl group is preferably of 1 to 4 carbon atoms in the alkoxy moiety and may be exemplified by methoxycarbonyl, ethoxycarbonyl, propoxycarbonyl, isopropoxycarbonyl and butoxycarbonyl. The aryl group is preferably of 6 to 10 carbon atoms and may be exemplified by phenyl and naphthyl. The group of the formula

is contemplated to embrace saturated 5- to 7-membered cyclic amino groups which may be further interrupted by hetero-atom(s), such as nitrogen atom, oxygen atom and the like, other than the amino-nitrogen atom attached to the carbon atom of the carbonyl moiety and may be exemplified by piperidyl, pyrrolidyl, hexamethyleneimino, morpholyl and piperazyl: These cyclic amino groups may also have a substituent at any possible position, the substituent including, for example, an alkyl group of 1 to 4 carbon atoms, e.g., methyl, ethyl, propyl, isopropyl or butyl and an aryl group optionally substituted with alkyl or halogen, e.g., phenyl, chlorophenyl or tolyl.

We have now found that the isoxazolone derivatives (I) show valuable pharmacological properties: More specifically, some of them show high analgesic activity, one group of them shows prominent anti-inflammatory activity, another group of them shows high antitussive activity and certain group of them shows high antihypertensive activity and thus they are useful as medicines.

It is, accordingly, an object of this invention to provide the new isoxazolone derivatives (I) which have valuable pharmacological properties.

Another object of this invention is to provide a process for the preparation of the new and useful isoxazolone derivative (I).

Other objects of this invention will be apparent to those skilled in the art from the following description.

According to one aspect of this invention, there are provided the new isoxazolone derivatives of the above formula (I). In view of their pharmacological properties, a preferable and more effective class of the present isoxazolone derivatives can be represented by the formula

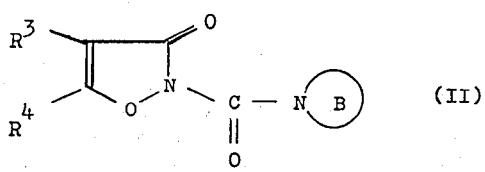

wherein $R^3$ is hydrogen atom, an alkyl group of 1 to 4 carbon atoms or a halogen atom, $R^4$ is hydrogen atom, an alkyl group of 1 to 4 carbon atoms or phenyl group and a group of the formula

is morpholyl group, pyrrolidyl group, piperidyl group, a $C_1 \sim C_4$ alkyl-substituted piperidyl group, hexamethyleneimino group, 4-phenylpiperazyl group or a 4-(halophenyl)piperazyl group.

A more preferable group of the isoxazolone derivatives (I) of this invention can be represented by the formula

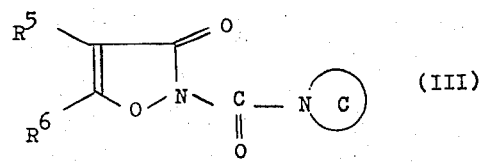

wherein $R^5$ is hydrogen atom, methyl group, chlorine atom or bromine atom, $R^6$ is hydrogen atom, methyl group, ethyl group or phenyl group and a group of the formula

is morpholyl group, piperidyl group, pyrrolidyl group, 2,6-dimethylpiperidyl group, hexamethyleneimino group, 4-phenylpiperazyl group or 4-(3-chlorophenyl)-piperazyl group.

Representative of the isoxazolone derivatives (I) of this invention are as follows:

| Compound No. | Chemical Name |
|---|---|
| 1 | 2-(piperidinocarbonyl)-4-isoxazolin-3-one |
| 2 | 2-(N-phenylpiperazinocarbonyl)-4-isoxazolin-3-one |
| 3 | 2-(hexamethyleneiminocarbonyl)-4-isoxazolin-3-one |
| 4 | 2-(pyrrolidinocarbonyl)-4-isoxazolin-3-one |
| 5 | 2-(N-phenylpiperazinocarbonyl)-5-methyl-4-isoxazolin-3-one |
| 6 | 2-(2,6-dimethylpiperidinocarbonyl)-5-methyl-4-isoxazolin-3-one |
| 7 | 2-(morpholinocarbonyl)-4,5-dimethyl-4-isoxazolin-3-one |
| 8 | 2-(morpholinocarbonyl)-5-ethyl-4-isoxazolin-3-one |
| 9 | 2-(morpholinocarbonyl)-5-phenyl-4-isoxazolin-3-one |
| 10 | 2-(N-3-chlorophenylpiperazinocarbonyl)-4-chloro-5-methyl-4-isoxazolin-3-one |
| 11 | 2-(N-phenylpiperazinocarbonyl)-4-chloro-5-methyl-4-isoxazolin-3-one |
| 12 | 2-(morpholinocarbonyl)-4-isoxazolin-3-one |

The isoxazolone derivatives (I) of this invention may be easily administered via oral or parenteral route in a wide variety of unit dosage forms commonly employed in the art. Such dosage forms may include, for instance, the preparations for oral administration, e.g., tablets, powders, capsules, solutions and the like and the preparations for parenteral administration, e.g., subcutaneously, intravenously or intramuscularly injectable solutions, suspensions, emulsions and the like. These dosage forms may be easily prepared by employing conventional pharmaceutical techniques and well-known excipients and pharmaceutically acceptable additives. Depending upon the solubility, stability and other physico-chemical properties of the active isoxazolone derivatives (I) and also upon the types and severities of the diseases to be treated, a special unit dosage form may be readily selected and prepared by those skilled in the art.

Total daily dosage of the isoxazolone derivative (I) of this invention may usually within the range of about 20 ~ 1,500 mg for adult, while smaller or larger daily dosage may be satisfactorily applied in view of the body weight and age of the patient to be administered, the types and severities of the diesease to be treated and other factors. For instance, a particular total daily dosage as analgesics and anti-inflammatory drugs is usually of about 300 ~ 1,500 mg. for adult, a single dose being of about 100 ~ 500 mg. in several divided dosage forms. Another particular total daily dosage as antitussives is usually of about 30 ~ 100 mg. for adult, a single dose being of about 10 ~ 25 mg. in 3 to 4 divided dosage forms. One particular total daily dosage as antihypertensive agents is usually of about 20 ~ 120 mg. for adult, a single dose being of 20 ~ 40 mg. in 1 to 3 divided forms.

According to another aspect of this invention, there is provided a process for the preparation of the isoxazolone derivative of the formula (I). The process of this invention comprises two alternate embodiments, namely, Embodiments A and B: Embodiment A comprises reacting an isoxazolone derivative having the formula

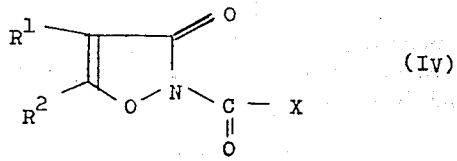

(IV)

wherein $R^1$ and $R^2$ are as defined above and X represents a halogen atom with a cyclic amine having the formula

(V)

wherein a group of the formula

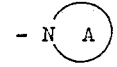

is as defined above; and Embodiment B comprises reacting a hydroxyisoxazole derivative having the formula

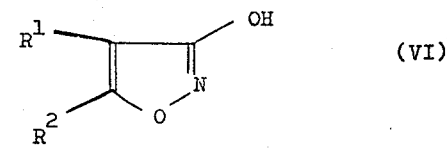

(VI)

wherein $R^1$ and $R^2$ are as defined above with a carbamoyl halide having the formula

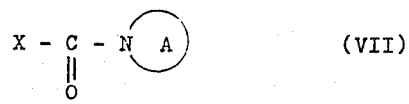

(VII)

wherein X and a group of the formula

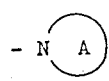

are as defined above.

More specifically, in one embodiment A, the starting material, i.e., the isoxazolone derivative (IV) is formed by reacting the hydroxyisoxazole derivative (VI) with a carbonyl halide, for example, phosgene, carbonyl dibromide and the like in an inert organic solvent, for example, hydrocarbons, e.g., benzene or toluene, halogenated hydrocarbons, e.g., methylene chloride or chloroform or ethers, e.g., diethyl ether or tetrahydrofuran. Then, the isoxazolone derivative (IV) thus formed is intimately contacted with the cyclic amine (V) in the presence or absence of a solvent, preferably in the presence thereof. The solvent which may be employed in this reaction may be any of those solvents that could not adversely affect this reaction. Examples of such solvents include hydrocarbons, e.g., benzene, toluene or xylene; halogenated hydrocarbons, e.g., methylene chloride, chloroform, carbon tetrachloride or chlorobenzene; ethers, e.g., diethyl ether, tetrahydrofuran or dioxane; carbon disulfide; and the like. As is apparent to those skilled in the art, the reaction of this embodiment is based on dehydrohalogenation and, accordingly, the reaction may be preferably conducted in the presence of an acid binding agent.

The acid binding agent which may be employed in the reaction may be any of those agents ordinarily utilized in the art for dehydrohalogenation and, illustratively, may include inorganic bases, e.g., basic alkali metal compounds and organic bases, e.g., tertiary amines. Alternatively, the cyclic amine (V) may be employed in a suitable amount more than that required to be a reagent, as it may act as both a reagent and an acid binding agent. In order to make the reaction system more homogeneous, the reaction proceeding more smooth and the treatment after the reaction easier, it is more preferable to employ as an acid binding agent a tertiary amine such as straight-, saturated cyclic- and unsaturated cyclicamines, e.g., triethylamine, tributylamine, trioctylamine, dimethylaniline, N-methylmorpholine, N-ethylmorpholine, N-methylpyrrolidine, N-methylpiperidine, N,N'-dimethylpiperazine, triethylenediamine, pyridine, quinoline and the like. It is usual and most preferable to employ triethylamine because of its availability. The amount of the acid binding agent to be used is advantageously equimolar or slightly excers to that of the starting material. The reaction temperature is not critical, but the reaction may usually and smoothly proceed at room temperature to yield the desired product in a good yield, but a lower or higher temperature may be favourably applied in the reaction. The reaction period is not critical, but the reaction is usually completed within several hours. The reagent, that is, the cyclic amine (V) may be employed in the reaction in the form of either a free base or an acid addition salt thereof. In case of the acid addition salt of the cyclic amine (V), it is usual and preferable to use a sufficient amount of the acid binding agent not only to neutralize the acid liberated from the above acid addition salt but also to exert its action as an acid binding agent.

After completion of the reaction, the desired product (I) may be recovered from the reaction mixture by a conventional method. For instance, where the solvent is water-immiscible, insolubles are filtered off from the reaction mixture, the filtrate is washed with a suitable acid, base or water and then the solvent is distilled off to give the desired product. If necessary, the desired product thus recovered may be further purified by a conventional means, e.g., recrystallization, chromatography and the like.

In another embodiment B, the reaction can be effected by intimately contacting the starting material (VI) with the carbamoyl halide (VII) in the presence or absence of an inert organic solvent, preferably in the presence thereof. The reaction in this embodiment is classified into a dehydrohalogenation reaction. However, it is not preferable to accelerate the reaction by the use of an acid binding agent, but advantageous to proceed the reaction more smoothly by heating, since the presence of the acid binding agent tends to result in the formation of an undesirable isomer of the end product, i.e., the isoxazole derivative having carbamoyloxy group at 3-position.

The solvent which may be employed in this reaction may be any of those solvents that could not adversely affect the reaction, for example, hydrocarbons, halogenated hydrocarbons, nitrohydrocarbons, ethers and the like. As shown above, the reaction may be accelerated by heating and thus it is preferred in this embodiment to employ a relatively high boiling solvent, advantageously such solvents boiling at about 80°C or higher as benzene, toluene, xylene, chlorobenzene, nitrobenzene, o,o-dichlorobenzene, trichloroethane, nitromethane, ligroin, dioxane, diethoxyethane and the like. Particularly preferable are those hydrocarbon solvents in which the hydrogen halide formed in situ during the reaction is less soluble and toluene, xylene and the like are usually employed. For a better achievement in the yield of the desired product and the acceleration of the reaction proceeding, it is also preferred to eliminate from the reaction system the hydrogen halide formed during the reaction by introducing an inert gas, e.g., gaseous nitrogen, argon or helium thereinto.

The reaction temperature is not critical, but a preferable temperature range is of about 80° ~ 150°C and more preferable is a temperature of about 100° ~ 120°C.

The reaction period is not critical and variable depending upon the reaction temperature and other factors, but the reaction is usually completed within about 2 ~ 20 hours.

After completion of the reaction, the desired product may be recovered from the reaction mixture by a conventional method. For instance, the solvent is distilled off from the reaction mixture to give the desired product. If necessary, the end product thus recovered may be further purified by a conventional means, for example, recrystallization, chromatography and the like.

The following examples are given solely for the purpose of illustrating of this invention.

EXAMPLE 1.

2-(Piperidinocarbonyl)-4-isoxazolin-3-one

To a solution of 0.85 g. of 3-hydroxyisoxazole in 20 ml. of dry benzene was added 1 ml. of liquid phosgene and the resulting mixture was heated under reflux for 2 hours.

After cooling, excers phosgene and benzene were removed by distillation under reduced pressure and the residue again dissolved in 40 ml. of dry benzene.

To the resulting solution was added dropwise 10 ml. of a solution of 0.765 g. of piperidine and 1.0 g. of triethylamine in benzene while stirring under ice-cooling and then the mixture was stirred at room temperature for additional 1 hour.

The crystalline mass separated in situ was recovered by filtration and washed with ether. The combined filtrate and washings were washed successively with water, 5 percent aqueous sodium bicarbonate, water and then saturated sodium chloride solution and thereafter dried over anhydrous sodium sulfate. After removal of the solvent by distillation under reduced pressure, the residue was subjected to column chromatography (silica gel; eluent; a 3 : 1 mixture of n-hexane and acetone) and then recrystallized from n-hexane to give 0.95 g. of the desired product. Yield 54.0 %, m.p. 102° ~ 103°C.

Analysis for $C_9H_{12}N_2O_3$:Calculated: C, 55.10; H, 6.17; N, 14.28; Found : C, 54.99; H, 6,19; N, 14.21.

Following the substantially same procedure as set forth above, the isoxazolone compounds listed below were prepared:

2-(N-phenylpiperazinocarbonyl)-4-isoxazolin-3-one,
Yield 56.9 %, m.p. 96.5° ~ 97°C.
Analysis for $C_{14}H_{15}N_3O_3$:Calculated: C, 61.26; H, 5.48; N, 13.18, Found : C, 61.52; H, 5.53; N, 15.37.

2-(hexamethyleneiminocarbonyl)-4-isoxazolin-3-one,
Yield 52.4 %, m.p. 65.5° ~ 66°C
Analysis for $C_{10}H_{14}N_2O_3$:Calculated: C, 57.13; H, 6.71; N, 13.32; Found : C, 57.08; H, 6.69; N, 13.37.

2-(pyrrolidinocarbonyl)-4-isoxazolin-3-one,
Yield 71.3 %, m.p. 117°C.
Analysis for $C_8H_{10}N_2O_3$:Calculated: C, 52.74; H, 5.53; N, 15.38; Found : C, 52.94; H, 5.51; N, 15.26.

2-(morpholinocarbonyl)-4-isoxazolin-3-one,
Yield 73.0 %, m.p. 118° ~ 119°C.

Analysis for $C_8H_{10}N_2O_4$:Calculated: C, 48.48; H, 5.09; N, 14.14; Found: C, 48.57; H, 5.17; N, 13.87.

2-(N-phenylpiperazinocarbonyl)-5-methyl-4-isoxazolin-3-one,

Yield 83.6 %, m.p. 102° ~ 103°C.

Analysis for $C_{15}H_{17}N_3O_3$:Calculated: C, 62.71; H, 5.96; N, 14.62; Found : C, 62.72; H, 5.89; N, 14.69.

2-(2,6-dimethylpiperidinocarbonyl)-5-methyl-4-isoxazolin-3-one,

Yield 65.3 %, m.p. 111.5° ~ 112°C.

Analysis for $C_{12}H_{18}N_2O_3$:calcalated: Calculated 60.49; H, 7.61; N, 11.75; Found : C, 60.36; H, 7.62; N, 11.71.

2-(morpholinocarbonyl)-4,5-dimethyl-4-isoxazolin-3-one,

Yield 64.4 %, m.p. 71° ~ 72°C.

Analysis for $C_{10}H_{14}N_2O_4$:Calculated: C, 53.09; H, 6.24; N, 12.38; Found : C, 52.74; H, 6.36; N, 12.62.

2-(morpholinocarbonyl)-5-ethyl-4-isoxazolin-3-one,
Yield 54.2 %, m.p. 77° ~ 78°C.

Analysis for $C_{10}H_{14}N_2O_4$:Calculated:
Calculated: C, 53.09; H, 6.24; N, 12.38; Found : C, 53.24; H, 6.23; N, 12.51.

2-(morpholinocarbonyl)-5-phenyl-4-isoxazolin-3-one,

Yield 67.5 %, m.p. 113° ~ 114°C.

Analysis for $C_{14}H_{14}N_2O_4$:Calculated: C, 61.31; H, 5.15; N, 10.21; Found: C, 61.26; H, 5.10; N, 10.47.

2-(N-3-chlorophenylpiperazinocarbonyl)-4-chloro-5-methyl-4-isoxazolin-3-one,

Yield 53.4 %, m.p. 128.5° ~ 129.5°C. Analysis for $C_{15}H_{14}Cl_2N_3O_3$:Calculated: C, 50.58; H, 4.25; N, 11.80; Cl, 19.91; Found : C 50.99; H, 4.32; N, 11.65; Cl, 19.86.

2-(N-phenylpiperazinocarbonyl)-4-chloro-5-methyl-4-isoxazolin-3-one,

Yield 62.3 %, m.p. 117.5° ~ 118.5°C.

Analysis for $C_{15}H_{16}ClN_3O_3$:Calculated: C, 55.99; H, 5.01; N, 13.06; Cl, 11.01; Found : C, 55.90; H, 4.99; N, 13.16; Cl, 11.07.

5-phenyl-2-(4-methylpiperizinocarbonyl)-4-isoxazolin-3-one, m.p. 125° ~ 127°C.

Analysis for $C_{16}H_{18}N_2O_3$:Calculated: C, 67.11; H, 6.34; N, 9.78; Found : C, 67.00; H, 6.30; N, 9.81.

5-phenyl-2-(2-methylpiperizinocarbonyl)-4-isoxazolin-3-one, m.p. 100° ~ 102°C.

Analysis for $C_{16}H_{18}N_2O_3$:Calculated: C, 67.11; H, 6.34; N, 9.78; Found : C, 66.90; H, 6.25; N, 9.87.

5-phenyl-2-(4-benzylpiperizinocarbonyl)-4-isoxazolin-3-one, m.p. 120° ~ 123°C.

Analysis for $C_{22}H_{22}N_2O_3$ calculated: C, 72.91; H, 6.12; N, 7.73; Found : C, 73.03; H, 6.14; N, 7.93.

5-phenyl-2-(2.6-dimethylmorpholinocarbonyl)-4-isoxazolin-3-one, m.p. 130° ~ 132°C Analysis for $C_{16}H_{18}N_2O_4$:Calculated: C, 63.56; H, 6.00; N, 9.27; Found: C, 63.33; H, 6.03; N, 9.54.

5-phenyl-2-(N-methylpiperazinocarbonyl)-4-isoxazolin-3-one, m.p. 136° ~ 138°C

Analysis for $C_{15}H_{17}N_2O_3$:Calculated: C, 62.70; H, 5.96; N, 14.63; Found : C, 62.50; H, 5.97; N, 14.76.

5-phenyl-2-(N-phenylpiperazinocarbonyl)-4-isoxazolin-3-one, m.p. 135° ~ 137°C

Analysis for $C_{20}H_{19}N_3O_3$:Calculated: C, 68.75; H, 5.48; N, 12.03; Found: C, 68.63; H, 5.53; N, 12.29.

5-methyl-2-(4-benzylpiperizinocarbonyl)-4-isoxazolin-3-one, m.p. 120° ~ 123°C

Analysis for $C_{17}H_{20}N_2O_3$:Calculated: C, 67.98; H, 6.71; N, 9.33; Found : C, 67.90; H, 6.91; N, 9.66.

2-piperizinocarbonyl-benzisoxazolin-3-one, m.p. 110° ~ 111°C

Analysis for $C_{13}H_{14}N_2O_3$: Calculated: C, 63.40; H, 5.73; N, 11.38; Found: C, 63.48; H, 5.86; N, 11.33.

2-(4-methylpiperizinocarbonyl)-benzisoxazolin-3-one, m.p. 101° ~ 103°C

Analysis for $C_{14}H_{16}N_2O_3$: Calculated: C, 64.60; H, 6.20; N, 10.76; Found: C, 64.32; H, 6.10; N, 10.75.

2-(N-methylpiperazinocarbonyl)-benzisoxazolin-3-one, m.p. 117° ~ 120°C

Analysis for $C_{13}H_{15}N_3O_3$: Calculated: C, 59,76; H, 5.79; N, 16.08; Found: C, 59.58; H, 5.88; N, 15.99.

2-(N-phenylpiperazinocarbonyl)-benzisoxazolin-3-one, m.p. 92° ~ 95°C

Analysis for $C_{18}H_{17}N_2O_3$: Calculated: C, 66.86; H, 5.30; N, 13.00; Found: C, 66.65; H, 5.31; N, 13.17.

N,N'-bis-(3-oxo-5-phenyl-4-isoxazolin-2-yl-carbonyl)-trans-2,5-dimethylpiperazine, m.p. 243° ~ 244°C Analysis for $C_{26}H_{24}N_4O_6$: Calculated: C, 63.92; H, 4.95; N, 11.47; Found: C, 63.72; H, 5.10; N, 11.28.

EXAMPLE 2.

2-(2,6-Dimethylpiperidinocarbonyl)-5-methyl-4-isoxazolin-3-one

A solution of 2.1 g. of N-chlorocarbonyl-2,6-dimethylpiperidine and 1.0 g. of 5-methyl-3-hydroxyisoxazole in 40 ml. of toluene was heated under reflux for 12 hours.

After evolution of gaseous hydrogen chloride ceased, the reaction mixture was allowed to stand and then the solvent distilled off. The residue wsa subjected to column chromatography (silica gel; eluent, a 20 : 1 mixture of benzene and acetone) and then recrystallized from isopropyl ether to give 1.1 g. of the desired product.

Yield 46.2 %, m.p. 111.5° ~ 112°C.

Analysis for $C_{12}H_{18}N_2O_3$: Calculated: C, 60.49; H, 7.61; N, 11.75; Found: C, 60.36; H, 7.62; N, 11.71.

Following the substantially same procedure as set forth above, the isoxazolone compounds listed below were prepared:

2-(Pyrrolidinocarbonyl)-4-isoxazolin-3-one,
Yield 65.9 %, m.p. 117°C

Analysis for $C_8H_{10}N_2O_3$: Calculated: C, 52.74; H, 5.53; N, 15.38; Found: C, 52.94; H, 5.51; N, 15.26.

2-(hexamethyleneiminocarbonyl)-4-isoxazolin-3-one,

Yield 48.5 %, m.p. 65.5° ~ 66°C

Analysis for $C_{10}H_{14}N_2O_3$: Calculated: C, 57.13; H, 6.71; N, 13.32; Found: C, 57.08; H, 6.69; N, 13.37.

2-(morpholinocarbonyl)-4,5-dimethyl-4-isoxazolin-3-one,

Yield 70.8 %, m.p. 71° ~ 72°C

Analysis for $C_{10}H_{14}N_2O_4$: Calculated: C, 53.09; H, 6.24; N, 12.38; Found: C, 52.74; H, 6.36; N, 12.62.

2-(morpholinocarbonyl)-5-ethyl-4-isoxazolin-3-one,
Yield 57.5 %, m.p. 77° ~ 78°C Analysis for $C_{10}H_{14}N_2O_4$: Calculated: C, 53.09; H, 6.24; N, 12.38; Found: C, 53.24; H, 6.23; N, 12.51.

2-(morpholinocarbonyl)-5-phenyl-4-isoxazolin-3-one,

Yield 73.0 %, m.p. 113° ~ 114°C

Analysis for $C_{14}H_{14}N_2O_4$: Calculated: C, 61.31; H, 5.15; N, 10.21; Found: C, 61.26; H, 5.10; N, 10.47.

2-(morpholinocarbonyl)-4-isoxazolin-3-one,

Yield 55.6 %, m.p. 118° ~ 119°C

Analysis for $C_8H_{10}N_2O_4$: Calculated: C, 48.48; H, 5.09; N, 14.14; Found: C, 48.57; H, 5.17; N, 13.87.

2-(N-phenylpiperazinocarbonyl)-4-chloro-5-methyl-4-isoxazolin-3-one,

Yield 62.0 %, m.p. 117.5° ~ 118.5°C

Analysis for $C_{15}H_{16}ClN_3O_3$: Calculated: C, 55.99; H, 5.01; N, 13.06; Cl, 11.01; Found: C, 55.90; H, 4.99; N, 13.16; Cl, 11.07.

2-(4-benzylpiperidinocarbonyl)-5-phenyl-4-isoxazolin-3-one,

Yield 60.8 %, m.p. 120° ~ 123°C Analysis for $C_{22}H_{22}N_2O_3$: Calculated: C, 72.91; H, 6.12; N, 7.73; Found: C, 73.03; H, 6.14; N, 7.93.

2-(N-phenylpiperidinocarbonyl)-4-isoxazolin-3-one,

Yield 61.1 %, m.p. 96.5° ~ 97°C

Analysis for $C_{14}H_{15}N_3O_3$: Calculated: C, 61.26; H, 5.48; N, 15.18. Found: C, 61.52; H, 5.53; N, 15.37.

As explained hereinabove, the isoxazolone derivatives (I) of this invention show various pharmacological properties, in particular, high analgesic, anti-infammatory, antitussive and antihypertensive activities. In order to make a better understanding of this invention, some animal tests on pharmacological properties of the isoxazolone derivatives (I) are illustratively described hereinbelow:

Test method (I) Preparation of Test Solution:

Among the test compounds indicated below, each of the water-soluble compounds was formulated into a physiological salt solution thereof, while each of the water-insoluble or sparingly soluble compounds was formulated into a 0.3 percent CMC suspension thereof.

(II) Analgesic Activity
Method:

Following the acetic acid-writhing method reported by B. W. Whittle in the Brit. J. Pharmacol., 22, 246, (1964), the experiment was carried out by employing male mice of ddY-strain, weighing 20 ~ 25 g., each group consisting of 5 mice. Each animal was given an oral administration of the test solution and, after 30 minutes, an intraperitoneal injection of 0.2 ml. of 0.6 percent acetic acid. The number of "Writhing Symptom" was recorded from 5 to 15 minutes after acetic acid injection. Control animals were treated similarly. Degree of inhibition was calculated from the recorded results. The, $ED_{50}$ was calculated by the Litchfield-Wilcoxon method.

| Test Compound: | A | 2-(Morpholinocarbonyl)-4-isoxazolin-3-one |
| --- | --- | --- |
| | B | Phenylbutazone (control) |
| | C | Aminopyrine (control) |

(III) Anti-inflammatory Activity
Method:

Following the carrageenin-edema method reported by C. A. Winter et al. in the Proc. Soc. Exptl. Biol. Med., 111,544, (1962), the experiment was carried out by employing male rats of the Wistar-Imamichi strain, weighing about 150 g., each group consisting of 4 rats. Before administration of test solution, foot volume of each animal was measured and the animal was given an oral administration of test solution.

A volume of 0.05 ml of 1% carrageenin suspension in saline was injected subcutaneously into the plantar region of the hind paw of the animal 30 minutes after the administration.

The volume of the foot was measured 3 hours after the injection of carrageenin. The degree of inhibition is calculated according to the following equation:

$$\% \text{ Inhibition} = \frac{(\frac{V\ 3\ hrs.\ U}{V\ before.\ U} - 1) - (\frac{V\ 3\ hrs.\ T}{V\ before.\ T} - 1)}{(\frac{V\ 3\ hrs.\ U}{V\ before.\ U} - 1)}$$

V before.U: the volume of foot of untreated group before the injection of carrageenin.

V 3 hrs.U: the volume of foot of untreated group 3 hours after injection of carrageenin.

V before.T: the volume of foot of treated group before the injection of carrageenin.

V 3 hrs.T: the volume of foot of treated group 3 hours after the injection of carrageenin.

Test Compound:

A and B employed in the above analgesic activity test
(IV) Antitussive Activity
Method:

Following the mechanical stimulus method reported by K. Takagi et al. in YAKUGAKU ZASSHI [Journal of the Pharmaceutical Society of Japan, 80, 1497 (1960)], the experiment was carried out by employing male guinea pigs of the Hartley strain with body weights of 250–400 g. At 15, 30, 45, 60, 90 and 120 minutes after intraperitoneal administration of test solution, mechanical stimuli were given, and when no cough occurred to two or more stimuli, the test compound was regarded as effective. Then, $ED_{50}$ was calculated by the Litchfield-Wilcoxon method.

| Test Compound: | D | 2-(Morpholinocarbonyl)-5-phenyl-4-isoxazolin-3-one |
| --- | --- | --- |
| | E | Dextromethorphan (Control) |
| | F | Noscapine (Control) |
| | G | Codeine phosphate (Control) |

(V) Antihypertensive Activity
Method:

The experiment was carried out by employing female and male spontaneously hypertensive rats, weighing about 300 g. and having a blood pressure of 180 mmHg or higher, each group consisting of 2 rats. Each animal was given an oral administration of test solution and, after 2, 4 and 6 hours from the administration, the maximum blood pressure of the animal wsa measured by a plethysmographic tail method. From the time-response curve, the area under the curve was culculated and termed as the "Hyotensive Index".

| Test Compound: | H | 2-(N-Phenylpiperazinocarbonyl)-5-methyl-4-isoxazolin-3-one |
| --- | --- | --- |
| | I | Tolazoline (Control) |
| | J | Mecamylamine (Control) |

(VI) Acute Toxicity
Method:

Following a conventional procedure commonly employed in the art, the experiment was carried out by employing several groups of male mice of ddY-strain with body weights of 20-25 g. and intraperitoneally administering to the animal. The lethal effect on the animals was observed for one week. Then, $LD_{50}$ was calculated according to Litchfield-Wilcoxon method. (J. Pharmacol., 96, 99, 1949)

Test Results

Analgesic and Anti-inflammatory Activites:
The results are summarized in Table I.

Table I

| Activity | Test compound | A | B | C |
|---|---|---|---|---|
| Analgesic, $ED_{50}$ | | 39.5 mg./kg. (31.3 – 49.8) | — | 56.0 mg/kg. (42 – 74.5) |
| Anti-inflammatory | | 100 mg./kg.: 77% | 100 mg/kg: 65% | |
| (Inhibition %) | | 50 mg./kg: 49% | 50 mg/kg: 34% | — |
| Acute toxicity $LD_{50}$ | | 1000 mg./kg. | 880 mg./kg. | 950 mg./kg. |

Antitussive Activity:
The results are summarized in Table II.

Table II

| Activity | Test compound | D | E | F | G |
|---|---|---|---|---|---|
| $ED_{50}$ | | 105 mg/kg (32–346) | 115 mg/kg (84–156) | 90 mg/kg (64–132) | 36 mg/kg (24–54) |
| Acute toxicity $LD_{50}$ | | ca. 750 mg/kg (500–1000) | 182 mg/kg (169–196) | 700 mg/kg (487–1008) | 550 mg/kg (450–670) |
| Therapeutic Index ($LD_{50}/ED_{50}$) | | ca. 7 | 1.6 | 7.7 | 15.3 |

Antihypertensive Activity:
The results are summarized in Table III.

Table III

| Activity | Test compound | H | I | J |
|---|---|---|---|---|
| Hypotensive Index | | 10 mg/kg: 255 3 " : 140 | 20 mg/kg: 167 10 " : 159 | 60 mg/kg: 105 30 " : 96 |
| Acute toxicity $LD_{50}$ | | 300 mg/kg | 350 mg/kg | 140 mg/kg |

It will be apparent from the above-cited results that the new isoxazolone derivatives (I) of this invention show valuable pharmacological properties.

What is claimed is:

1. A compound having the formula

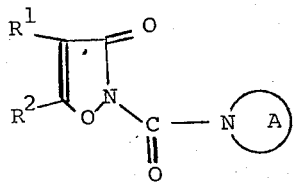

wherein $R^1$ represents a hydrogen atom, an alkyl group of from 1 to 4 carbon atoms or a halogen atom; $R^2$ represents a hydrogen atom, an alkyl group of from 1 to 4 carbon atoms, or a phenyl group; and a group of the formula

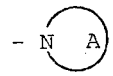

represents a morpholyl group, a pyrrolidyl group, a piperidyl group, a $C_1$-$C_4$ alkyl-substituted piperidyl group, a hexamethyleneimino group, a 4-phenylpiperazyl group or a 4-(halophenyl) piperazyl group.

2. The compound according to claim 1 wherein $R^1$ is a hydrogen atom, a methyl group, a chlorine atom or a bromine atom, $R^2$ is a hydrogen atom, a methyl group, an ethyl group or a phenyl group, and a group of the formula $$-N\underset{}{\bigcirc}A$$

is a morpholyl group, a piperidyl group, a pyrrolidyl group, a 2,6-dimethylpiperidyl group, a hexamethyleneimino group, a 4-phenylpiperazyl group or a 4-(3-chlorophenyl)-piperazyl group.

3. 2-(Piperidinocarbonyl)-4-isoxazolin-3-one.
4. 2-(N-Phenylpiperazinocarbonyl)-4-isoxazolin-3-one.
5. 2-(Hexamethyleneiminocarbonyl)-4-isoxazolin-3-one.
6. 2-(Pyrrolidinocarbonyl)-4-isoxazolin-3-one.
7. 2-(N-Phenylpiperazinocarbonyl)-5-methyl-4-isoxazolin-3-one.

8. 2-(2,6-Dimethylpiperidinocarbonyl)-5-methyl-4-isoxazolin-3-one.

9. 2-(Morpholinocarbonyl)-4,5-dimethyl-4-isoxazolin-3-one.

10. 2-(Morpholinocarbonyl)-5-ethyl-4-isoxazolin-3-one.

11. 2-(Morpholinocarbonyl)-5-phenyl-4-isoxazolin-3-one.

12. 2-(N-3-Chlorophenylpiperazinocarbonyl)-4-chloro-5-methyl-4-isoxazolin-3-one.

13. 2-(N-Phenylpiperazinocarbonyl)-4-chloro-5-methyl-4-isoxazolin-3-one.

14. 2-(Morpholinocarbonyl)-4-isoxazolin-3-one.

15. A process for preparing a compound having the formula

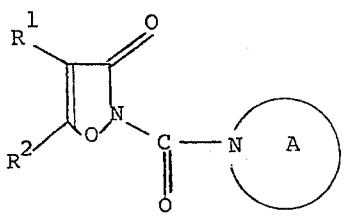 (I)

wherein $R^1$ represents a hydrogen atom, an alkyl group of from 1 to 4 carbon atoms or a halogen atom; $R^2$ represents a hydrogen atom, an alkyl group of from 1 to 4 carbon atoms, or a phenyl group; and a group of the formula

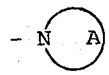

is a morpholyl group, a pyrrolidyl group, a piperidyl group, a $C_1$-$C_4$ alkylsubstituted piperidyl group, a hexamethyleneimino group, a 4-phenylpiperazyl group or a 4-(halophenyl)piperazyl group, which comprises reacting a compound having the formula

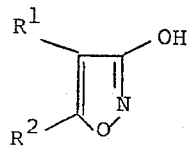

wherein $R^1$ and $R^2$ are as defined above with a carbamoyl halide having the formula

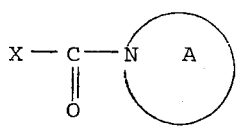

wherein a group of the formula

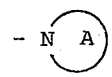

is as defined above and X represents a halogen atom in the absence of a base.

* * * * *

UNITED STATES PATENT AND TRADEMARK OFFICE
CERTIFICATE OF CORRECTION

PATENT NO. : 3,892,745
DATED : July 1, 1975
INVENTOR(S) : KAZUO TOMITA et al

It is certified that error appears in the above-identified patent and that said Letters Patent are hereby corrected as shown below:

Column 6, line 58: replace "13.18" with -- 15.18 --.

Column 7, line 11: delete "calcalated".

Column 7, line 12: before "60.49", insert -- C, --.

Column 7, line 21: delete "Calculated".

Column 7, line 33: replace "$C_{15}H_{14}Cl_2N_3O_3$" with -- $C_{15}H_{15}Cl_2N_3O_3$ --.

Column 8, line 43: replace "wsa" with -- was --.

Column 10, line 60: replace "wsa" with -- was --.

Signed and Sealed this second Day of March 1976

[SEAL]

Attest:

RUTH C. MASON
Attesting Officer

C. MARSHALL DANN
Commissioner of Patents and Trademarks